E. HUNTZINGER.
MULTIPLYING CAMERA.
APPLICATION FILED DEC. 5, 1919.
1,365,999.
Patented Jan. 18, 1921.
2 SHEETS—SHEET 1.
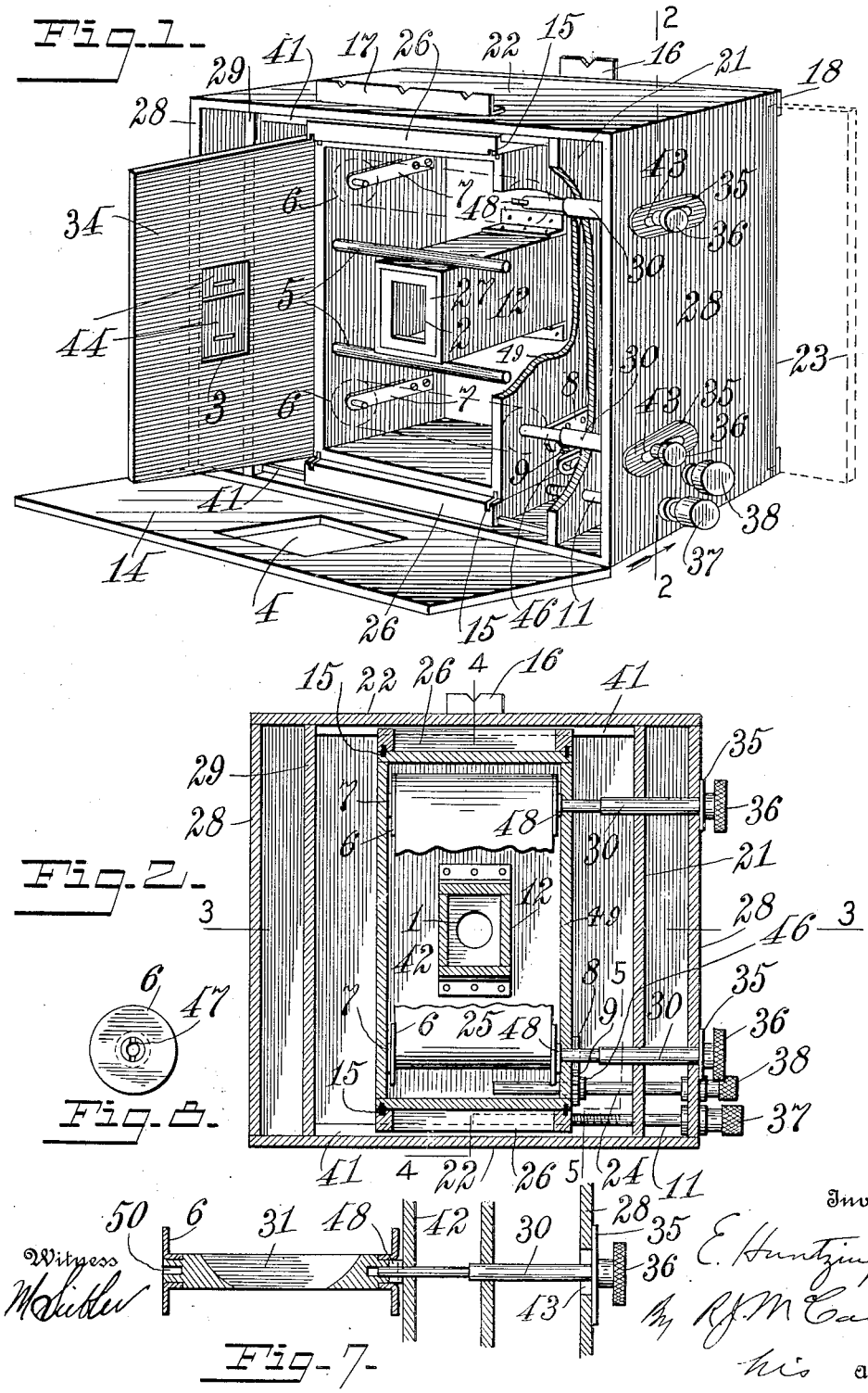

E. HUNTZINGER.
MULTIPLYING CAMERA.
APPLICATION FILED DEC. 5, 1919.
1,365,999.
Patented Jan. 18, 1921.
2 SHEETS—SHEET 2.
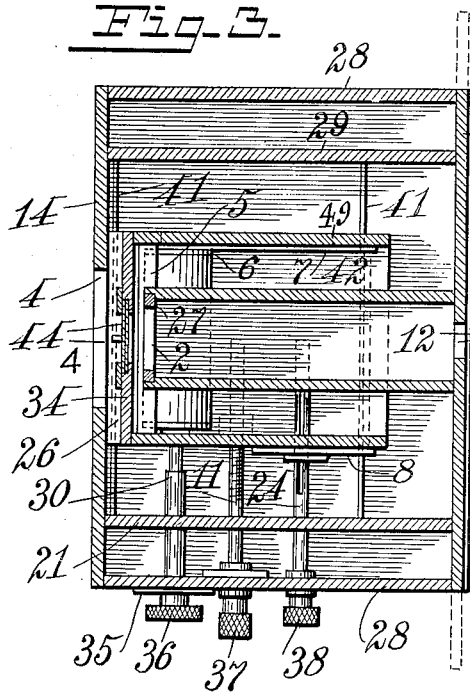
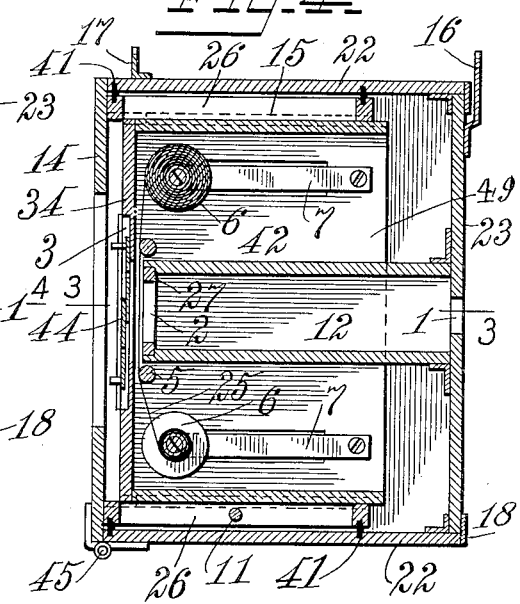
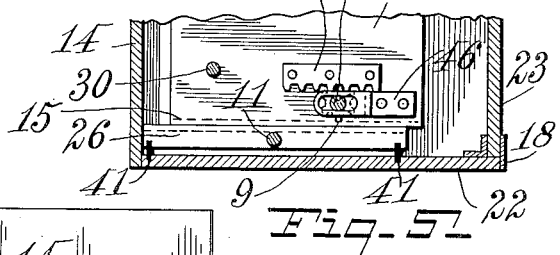
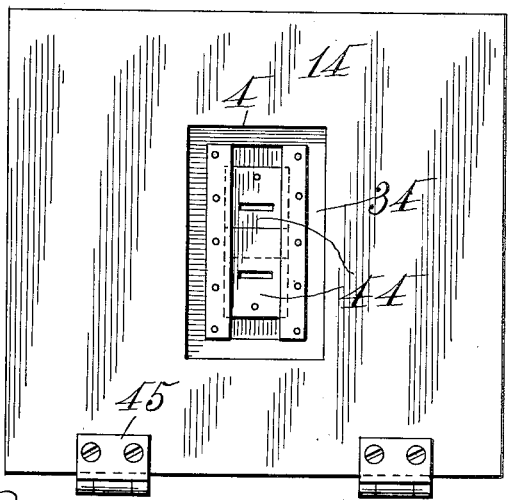
Witness
M. Liebler
Inventor
E. Huntzinger
By R. J. McCarty
his Attorney

UNITED STATES PATENT OFFICE.

ETHAN HUNTZINGER, OF PIQUA, OHIO.

MULTIPLYING-CAMERA.

1,365,999.  Specification of Letters Patent.  Patented Jan. 18, 1921.

Application filed December 5, 1919. Serial No. 342,631.

*To all whom it may concern:*

Be it known that I, ETHAN HUNTZINGER, a citizen of the United States, residing at Piqua, in the county of Miami and State of Ohio, have invented certain new and useful Improvements in Multiplying-Cameras, of which the following is a specification.

My invention relates to new and useful improvements in cameras, and more particularly to cameras of the multiplying type.

The object of the invention is to provide means adapting a roll film to a multiplying camera whereby two or more rows of exposures on one roll of film may be obtained.

Preceding a more particular description of the invention general reference is made to the accompanying drawings, of which Figure 1 is a perspective view of a camera having my invention applied. The rear shutters are open in this view to disclose the interior, and parts are broken away to facilitate illustration. Fig. 2 is a section of the line 2—2 of Fig. 1. Fig. 3 is a section on the line 3—3 of Figs. 2 and 4. Fig. 4 is a section on the line 4—4 of Figs. 2 and 3. Fig. 5 is a detail sectional view of the focusing gear on the line 5—5 of Fig. 2. Fig. 6 is a rear elevation of the camera. Fig. 7 is a detail sectional view of one of the film spools and its winding key and Fig. 8 is an end view of one of the film spools.

In a more particular description of my invention similar reference characters denote the same parts as they appear in the several views of the drawings.

In carrying out my invention, I so construct the camera that two or more rows of exposures may be obtained on one roll of film successively. This object may be accomplished either by shifting the light chamber relatively to the film or the film relatively to the light chamber, whereby, in either case, any number of exposures of one size, or a number of exposures of different sizes may be had on one film. Means for accomplishing both operations are illustrated in the accompanying drawings and will be described more in detail as the description proceeds.

The lens opening —1— is in a sliding lens board —23— at the front of the camera. —28— designates the right and left sides of the camera. To the inner side of the lens slide —23— and in the rear of the lens —1— the light housing —12— is secured, in which the removable open frame —27— is mounted. The opening —2— in said frame —27— varies in accordance with the size of the picture. The lens slide —23— is moved as indicated in Figs. 1 and 3, in horizontal guides —18— on the top and bottom —22— of the camera. The light housing —12— projects into the film chamber —42— which is inclosed by side and bottom and top walls —49—49— and the rear door —34— which are parts of the camera structure. On each side of the film chamber thus formed are partition walls —21— and —29— which form a chamber in the camera in which the film chamber housing is located and into which light does not enter when the lens board —23— is shifted. When the said lens board is shifted the movement thereof is not sufficient in either direction to expose the space on the inside of the walls —21— and —29—. The film roll —25— as is commonly understood has one end secured in a slot —31— in a winding spool which is inclosed at the ends by flanges —6—, the spool having an opening —50— in one end and a cross slot —47— in the other end, see Fig. 7. The film spools are supported at one end upon spring —7— attached to the inner side of one of the light chamber walls —49—, and at the other end said spools are supported on the winding shafts —30— which have on their inner ends blades —48— which enter the cross slots —47— in the ends of the spools. The winding shafts project through oblong slots in the outer inside wall —21— and through oblong slots —43— in the side wall —28— of the camera. The exposed ends of the winding shafts —30— are fitted with finger pieces —36— by which the shafts are turned to unwind and rewind the film —25—. The said elongated slots are so formed in order to not interfere with the necessary movements of the film box in the operation of focusing. Over the said slots on the outside of the camera, similar shaped slotted plates —35— are placed for finish. The film is guided from one spool to the other over rods or supports —5— which are mounted in the walls —49— of the film chamber. The top and bottom of the film chamber have carriages —26— which have transverse slots that receive tracks —41— that extend between the walls —21— and —29— at the back and front of the camera. The film chamber has side adjustment on these tracks to shift the position of the film laterally to expose the film cross-wise. This lateral adjustment is accomplished by means of a screw —11— which engages the lower carriage —26—, and extends through the intermediate wall —21— and the outer wall —28— of the camera, and is there provided with a finger piece —37— by which to turn said screw to adjust the film cross-wise of the camera. The carriages —26— also have guide slots which receive guide strips or tracks —15— on the top and bottom of the film chamber to guide the same in the focusing movements. These movements are accomplished by means of a rack —8— secured to a side wall of the film chamber —42—, and a pinion —9— in mesh with said rack. The pinion —9— is splined to the focusing shaft —24— which has bearing in the intermediate wall —21— and outer wall —28— of the camera. The shaft —24— has a finger piece —38— on the outside of the camera by which said shaft is turned in focusing. On the outside of one of the side walls of the film chamber has fixed to it in proximity to the rack —8— a plate or keeper —46— with an oblong opening therein through which the focusing shaft —24— extends. The slot is provided in the plate —46— to maintain the pinion —9— in mesh with the rack —8— when lateral adjustment is imparted to the film chamber to shift the positions of the film.

The film chamber is closed by a rear door —34— hinged at a side 49 and having slides —44— in an opening —3— therein in line with the opening in the frame —27—. The slides —44— have slots or openings which are adjustable up and down and the slots therein is to enable the back of the film to be marked for the size picture desired, depending of course, on the size of the opening in the frame —27—. For example, looking at Fig. 1; if the film is being wound upon the upper roll, before the exposure, the back of the film is marked through the lower slot in the slide —44—, and after exposure, the film is wound until the mark is seen through the upper slot in the slide —44—, and the back of the film is marked through the lower slot for each successive exposure. The outer door —14— of the camera is hinged below at —45— and the same has an opening —4— therein through which film markings through the slides —44— may be performed.

While I have described my invention with some detail in order that the statute may be properly observed and conformed to, I do not wish to be understood as meaning that the details are vital in every case to the successful carrying out of my invention, for on the contrary changes may be made in such details without departing from the underlying principles of the invention, which comprehend means whereby rows of exposures on one roll film may be obtained.

Having described my invention, I claim:—

In a camera having lens and light chambers, a laterally movable slide upon which the said lens and light chambers are supported, a box adapted to support a roll film, said box being a part of the camera structure and into which the light chamber is projected, said roll film supporting box being adjustable laterally relative to the light chamber, and means for imparting focusing movements to said roll film supporting box whereby two or more transverse rolls of exposures may be obtained on a roll film.

In testimony whereof I affix my signature.

ETHAN HUNTZINGER.